US010541951B2

(12) United States Patent
Janajri

(10) Patent No.: US 10,541,951 B2
(45) Date of Patent: *Jan. 21, 2020

(54) ENHANCING NETWORK MESSAGING WITH A REAL-TIME, INTERACTIVE REPRESENTATION OF CURRENT MESSAGING ACTIVITY OF A USER'S CONTACTS AND ASSOCIATED CONTACTS

(71) Applicant: Inbox Group LLC, Florham Park, NJ (US)

(72) Inventor: Maher Janajri, Warren, NJ (US)

(73) Assignee: Inbox Group, LLC, Florham Park, NJ (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/470,746

(22) Filed: Mar. 27, 2017

(65) Prior Publication Data

US 2017/0279745 A1    Sep. 28, 2017

Related U.S. Application Data

(60) Provisional application No. 62/313,695, filed on Mar. 25, 2016.

(51) Int. Cl.
| | |
|---|---|
| H04L 12/58 | (2006.01) |
| H04N 21/2187 | (2011.01) |
| G06F 17/30 | (2006.01) |
| H04L 12/54 | (2013.01) |
| H04L 29/08 | (2006.01) |

(Continued)

(52) U.S. Cl.
CPC .......... *H04L 51/043* (2013.01); *G06F 16/954* (2019.01); *G06F 16/9535* (2019.01); *G06Q 10/00* (2013.01); *G06Q 10/10* (2013.01); *G06Q 10/1095* (2013.01); *G06Q 50/01* (2013.01); *H04L 12/1827* (2013.01); *H04L 12/56* (2013.01); *H04L 51/10* (2013.01); *H04L 51/20* (2013.01); *H04L 51/32* (2013.01); (Continued)

(58) Field of Classification Search
CPC ....... H04L 51/043; H04L 12/56; H04L 51/10; H04L 51/20; H04L 67/02; H04L 67/306; H04L 12/1827; H04L 51/32; G06F 16/9535; G06F 16/954; H04N 21/2187; G06Q 10/00; G06Q 10/10; G06Q 10/1095; G06Q 50/01
USPC ........................................................ 709/206
See application file for complete search history.

(56) References Cited

U.S. PATENT DOCUMENTS

| | | | |
|---|---|---|---|
| 2014/0040368 A1* | 2/2014 | Janssens | H04L 67/306 709/204 |
| 2016/0004778 A1* | 1/2016 | Finder | G06F 16/9535 707/722 |
| 2016/0308920 A1* | 10/2016 | Brunsch | H04L 65/403 |

* cited by examiner

*Primary Examiner* — Tu T Nguyen

(57) ABSTRACT

A method, system and software system is disclosed that networks a plurality of client messaging devices to one or more server devices. Each messaging device executes a client portion, and the server executes a server portion of a computer software system product stored therein. Cooperative execution of the software system product of the invention facilitates messaging services between the users, as well as the generation and continuous updating in real-time of a LIVE feed transmission that is transmitted over the network to each user actively logged into the system. The content of the LIVE feed is generated by the server and is customized for each user. When displayed by the user on the user's client messaging device, the LIVE feed information is a visual representation (updated continuously in real-time) of the communications activity of all of the user's contacts.

20 Claims, 13 Drawing Sheets

(51) Int. Cl.
*H04L 12/18* (2006.01)
*G06F 16/954* (2019.01)
*G06F 16/9535* (2019.01)
*G06Q 10/00* (2012.01)
*G06Q 10/10* (2012.01)
*G06Q 50/00* (2012.01)

(52) U.S. Cl.
CPC ............ *H04L 67/02* (2013.01); *H04L 67/306* (2013.01); *H04N 21/2187* (2013.01)

ENHANCING NETWORK MESSAGING WITH A REAL-TIME, INTERACTIVE REPRESENTATION OF CURRENT MESSAGING ACTIVITY OF A USER'S CONTACTS AND ASSOCIATED CONTACTS

CROSS-REFERENCE TO RELATED APPLICATION

This application claims priority to U.S. Provisional Application Ser. No. 62/313,695 filed Mar. 25, 2016 and entitled "ENHANCING NETWORK MESSAGING WITH A REAL-TIME, INTERACTIVE REPRESENTATION OF CURRENT MESSAGING ACTIVITY OF A USER'S CONTACTS AND ASSOCIATED CONTACTS," and which is incorporated herein in its entirety by this reference.

FIELD OF THE INVENTION

The invention relates to communication of messages over a network, and more particularly to messaging software applications used to coordinate the creation, transmission and receipt of messages between users via networked communications devices.

BACKGROUND OF THE INVENTION

Since the advent of the Internet, many forms of messaging services and applications have been developed to permit users to send and receive electronic messages to each other. One such messaging service is email. An email message is composed by a user on a client messaging device that is coupled to a network such as the Internet. The message is addressed in some way to one or more users, who are able to receive and display the message content on their respective messaging devices, also coupled to the network. The messages are often processed by a server device through which the messages are processed and stored for retrieval by the recipient users as email messages. The messages persist and can be retrieved and responses be made at the recipients' leisure, and thus the response does not have the immediacy of in-person communications.

Text messaging through SMS and MMS services by wireless telephones provide a bit more immediacy in the communications they facilitate, as the messages are delivered directly to the user's messaging devices and thus signing into a server and retrieval of messages from a server are not required. Further, the arrival of SMS and MMS messages are often announced with an audible alert and can be displayed easily upon their receipt.

Still, even these types of messages lack the immediacy of in-person communication. For example, email and SMS/MMS communications are direct, closed, and intentional. Put another way, when one employs these messaging services, one already has a reason for sending the message, the message is direct in that the person(s) intended as recipient(s) are already purposefully contemplated, and the communications are conducted in a closed manner (i.e. no other contacts or friends are able to observe the that the communication is taking place). Thus, there's no opportunity for a spontaneous communication to occur as result, as might happen in a public group setting such as a party, or in a "village square" type of social gathering.

For closed messaging systems, there is no indication to a user that the user's contacts are in fact available for conversation, or with whom they are conversing. Thus, a person may not be motivated or inspired to initiate a conversational type communication with such friends in the manner one might be if one were in a social gathering where those friends can be observed in communication directly. Moreover, while MMS does support broadcasting of texts to multiple users, this type of conversation is also set up purposefully and is typically directed to a particular group of users such as a study group, an employee group, etc. Again, there is no indication that any of the members of the group are available for conversation at any given time, and other contacts of the participants in a text chat are not aware of the group when present and chatting. Thus, the spontaneity of live conversation is still not motivated in the same way that it is in a group social setting.

Various social media web sites have evolved to add more of a social context to the online networked communications experience. Web sites such as Facebook seek to promote social interactions between friends through the posting of messages on the timeline's of each of member. Friends can also send each other messages and when those friends are online, those conversations can proceed much like an SMS or MMS text exchange. Facebook does provide a listing of a user's friends who are currently signed in to Facebook, but provides no indication as to whether they are actually active (that they walked away from their phone or computer while still signed in), with whom are they communicating, and what in types of communication activities are they currently engaged.

Moreover, while Facebook and other similar web sites provide suggestions for adding friends or contacts, and provide a list of friends of friends, this technique does not compel one to seek a connection with those associate friends or contacts in the same way in which one would be compelled to do so by the immediacy of observing those associates in active communication with one's own friends.

SUMMARY OF THE INVENTION

Figure 1A:
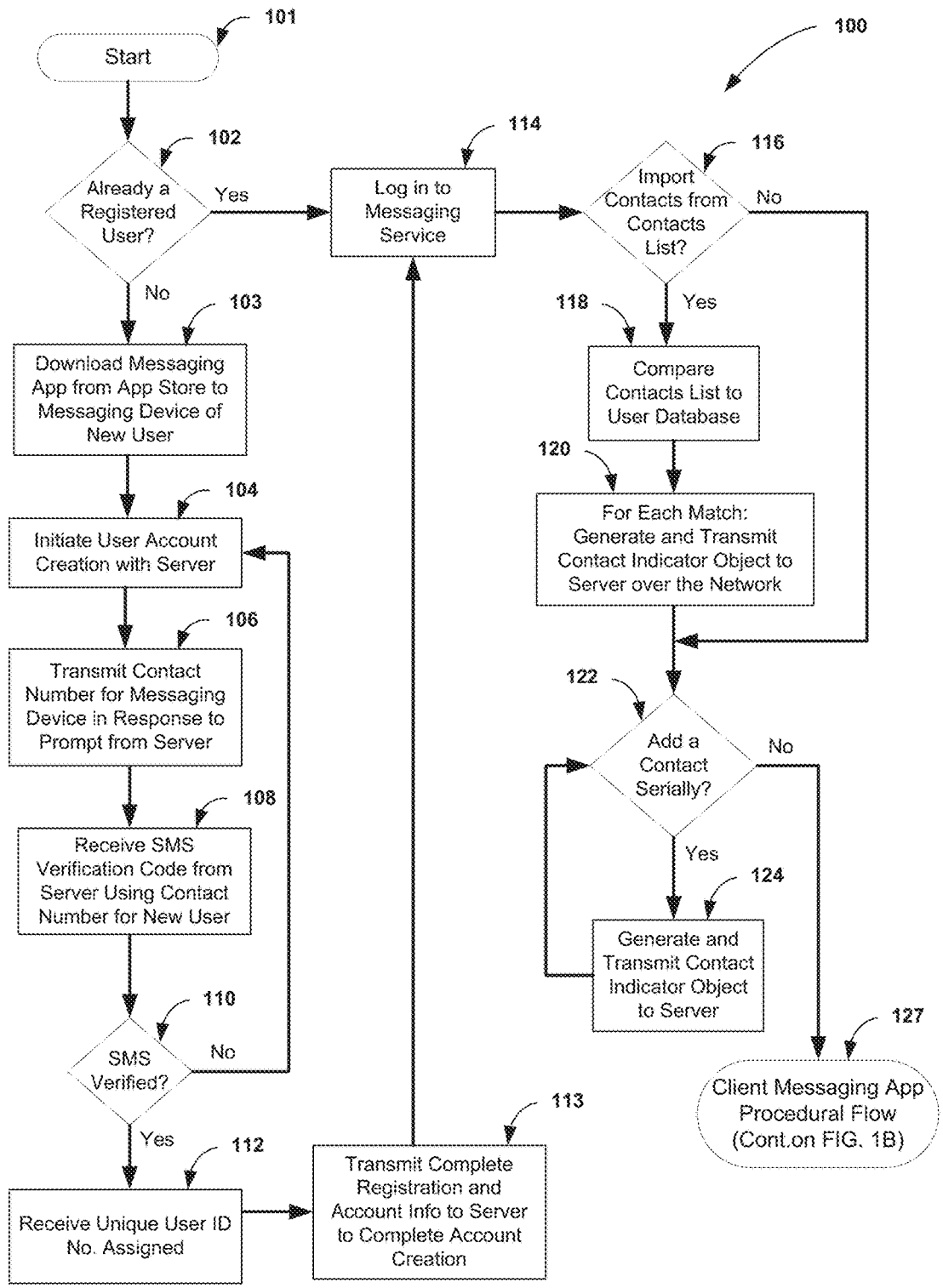
FIG. 1A a high-level procedural flow diagram illustrating embodiments of methods of the invention performed by a user's client device, the performance of these methods being the result of the execution of computer software code by the client device, the methods including facilitating registration of a new user that results in the downloading and installation of a client portion of a messaging computer software system product of the invention on the user's client messaging device.

A method, a system and a software system product have been disclosed that enhance network messaging among a community of users using a messaging service over a communications network, by providing to each active user of the community a personalized live feed that visually represents the current communications activities of other users over the network who are personal contacts of the active user.

In one aspect of the invention a method of the invention includes providing at least one server coupled to the network, the server configured to be accessed over the network by messaging devices operated by the users of the community. At least one server is provided that is coupled to the network, and is configured to be accessed over the network by messaging devices operated by the users of the community. A unique mapping is continuously maintained for each user of the community and all other users of the community that are currently personal contacts of the user. A live feed is continuously generated for each user of the community who is actively using the messaging service Generation of the live feed includes continuously receiving indicator objects using the server. The indicator objects are generated and transmitted over the network by the messaging devices of the users as they interact with the messaging service. The indicator objects are representative of the communications activities in which each generating and transmitting user is currently engaged while using the service. Each of the indicator objects are uniquely associated with the user whose messaging device has generated and transmitted them.

For each indicator object received by the server, the unique mapping for the user uniquely associated with the received indicator object is accessed, and an instantiation of the indicator object transmitted back over the network to each of the active users who are mapped to the user associated with the received object by the accessed mapping, the continuously transmitted instantiations of each indicator object forming a personal live feed for each user that can be used by the user's messaging device to display a visual representation of the current communications activities of the user's contacts in real time.

In a further embodiment, each user of the community is identified with a unique identification (ID) number and software instructions provided from the server to each user's messaging device. The software instructions configure the messaging device to generate indictor objects when engaging in communications activities using the messaging service and to embed each generated indicator object with the user's unique ID number.

In another embodiment, the software instructions further configure the messaging device to store the received indicator objects transmitted from the server as part of a current live feed, discard any previously stored received indicator objects rendered obsolete by newly received indicator objects and continuously display the current live feed on the messaging device when a live feed display mode is enabled by the user.

In another embodiment, the contacts of each user include direct contacts that are established by the user. In a further embodiment, the contacts of each user further include associate contacts who are direct contacts of each of the user's direct contacts.

In still another embodiment, the messaging services network facilitates chats between users of the community, each of the chats being assigned a unique chat ID, and wherein when a user enters a chat, the user's messaging device generates and transmits a presence indicator object to the server over the network, the presence object indicator including the user's ID and the chat ID embedded therein.

In a further embodiment, when the user engages in communications activities in the joined chat, the user's messaging device generates an activity indicator object that includes the chat ID, the user's ID and an activity type unique to the activity in which the user is engaged.

I another embodiment, the live feed includes a portion that represents current communications activities of the user's direct contacts and associate contacts, and a recent portion that represents previous communications activities for direct contacts.

In yet another embodiment, the mapping for each user is maintained in a contact mapping repository by the server.

In another embodiment, the mapping for each user in the contact mapping repository is updated each time a user is added or deleted from the community, and each time a user adds or removes another user to or from the user's contacts.

DETAILED DESCRIPTION

A messaging system of the invention is disclosed that includes a plurality of client messaging devices operated by registered users, the client messaging devices being coupled over a network (e.g. the Internet) to one or more server devices (the server is hereinafter referred to as a single entity for simplicity, but those of skill in the art will appreciate that multiple servers can be deployed to accommodate larger numbers of users). Each client device, on behalf of a user, executes a client portion of a computer software system product of the invention stored thereon, and the server executes a server portion of the computer software system product stored therein. When each portion is cooperatively executed, each client cooperatively interacts with the server to perform various methods of the invention. Cooperative execution of the software system product of the invention facilitates messaging services between the users, as well as the generation and continuous updating in real-time of a LIVE feed transmission that is transmitted over the network to each user actively logged into the system. The content of the LIVE feed is generated by the server and is customized for each user. When displayed by the user on the user's client messaging device, the LIVE feed information is a visual representation (updated continuously in real-time) of the communications activity of all of the user's contacts.

The user's contacts include those registered users of the system that are made contacts directly by the user (i.e. direct contacts), as well as those users who are direct contacts of the user's direct contacts (i.e. associate contacts). In this way, a user is able to view in real time, not only which of the user's direct contacts are currently active, but also with whom and in what type of communications activities they are currently engaged. In this way, the user will be stimulated to engage with his/her direct contacts, and perhaps also be stimulated to make associate contacts direct contacts, in much the same way as would occur if the user is observing the activities and interactions of such people while in physical proximity to them in a group setting.

FIGS. 1A-B and 2A-B disclose high-level procedural flows 100 and 200 respectively, which together illustrate processes performed by the client messaging device of a user as a result of executing the client messaging app portion of the software system product of the invention. The execution of flows 100 and 200 reflect the interactions of the client messaging device with both the user and the server. In an embodiment, the client messaging device can facilitate communication with the user through a graphical user interface that can include a touchscreen, a keyboard and/or voice recognition interfaces. The client messaging device further sends and receives information to and from the server over a network using network communications protocols as dictated by the network.

Figures 3A, 3B:
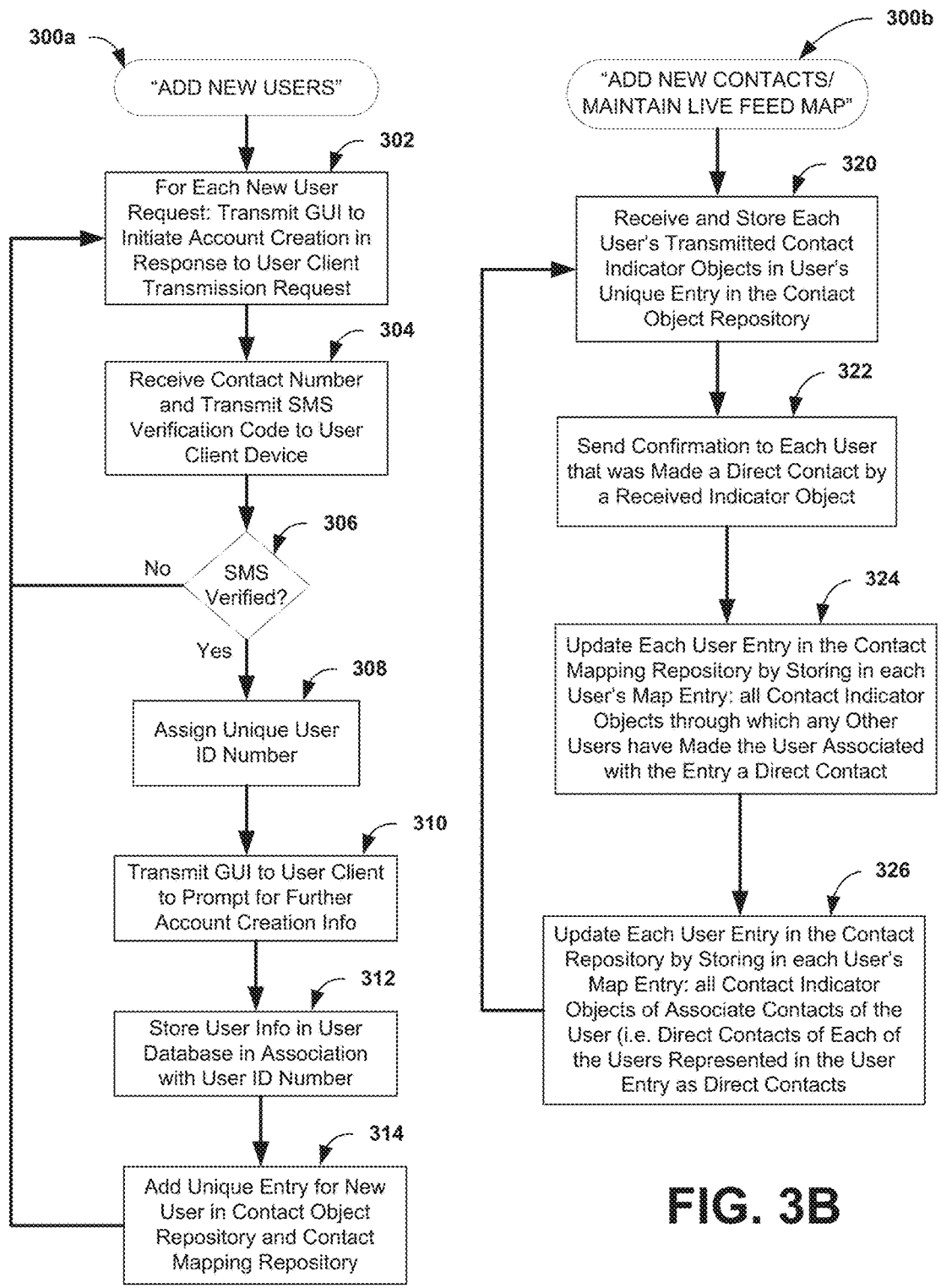
FIGS. 3A-C are high-level procedural flow diagrams illustrating various methods of the invention performed by the server resulting from the server's execution of a server portion of the computer software system product, the methods performed including monitoring each user's presence and activity in chats, and associating user contacts with one another to create a map from which to determine which users are to receive indicator objects from the other users as part of that user's LIVE feed.
Figure 3C:
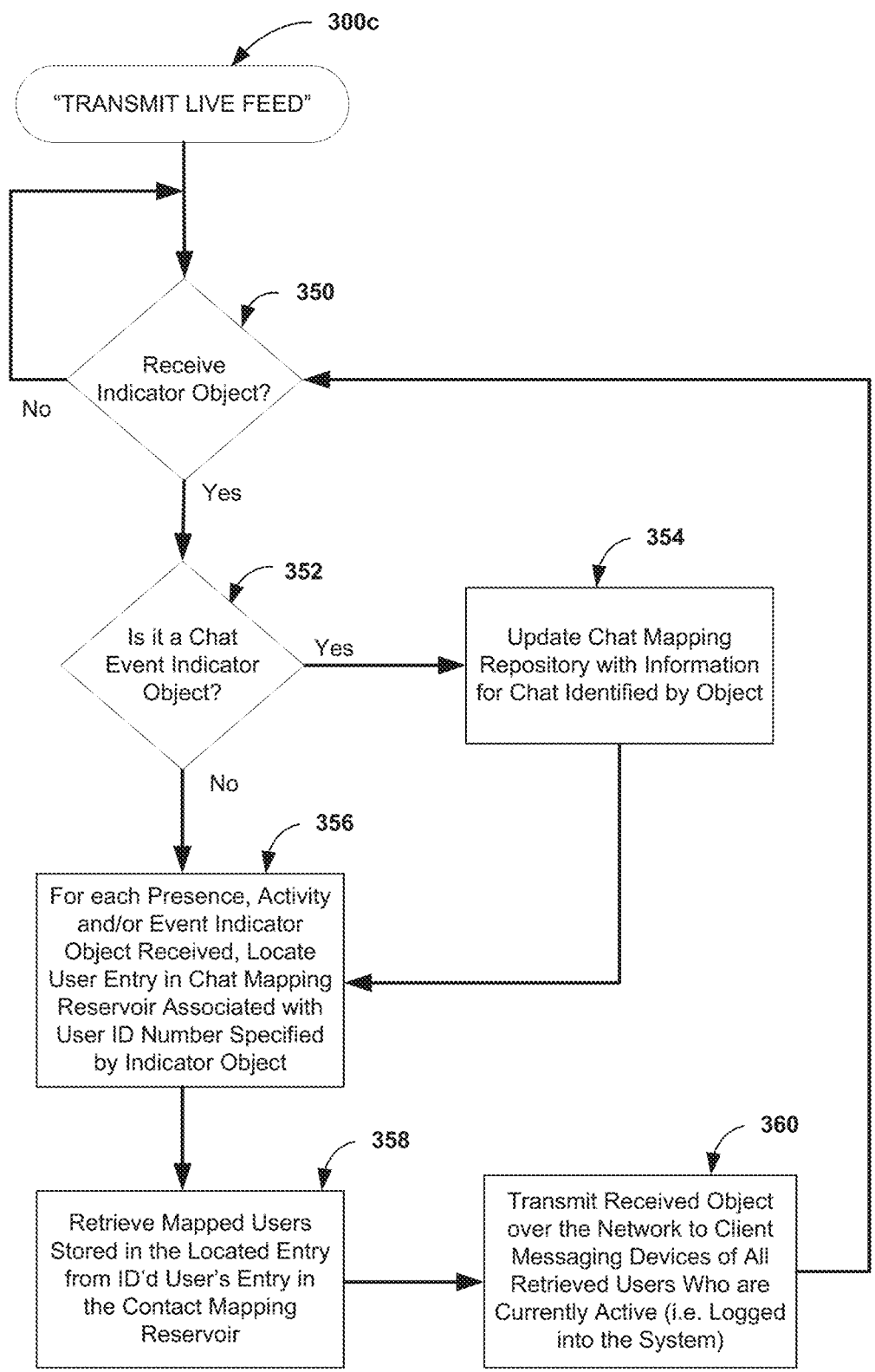

FIGS. 3A-C illustrate high-level procedural flows 300a-c respectively, which together illustrate processes performed by the server in executing the server portion of the software system product of the invention, as the server communicates with the client messaging devices of active users of the system of the invention.

Those of skill in the art will appreciate that the flow diagrams disclosed herein are at a high level and are but one possible embodiment reflecting one possible order in which execution of the program code of the software system product of the invention can be coded and executed. Therefore, it will be appreciated that the processes performed as represented by at least some of the processing steps described herein could be ordered differently without exceeding the scope of the invention as disclosed herein. In addition, while it is believed that the illustrated partitioning of the functions between the server portion and the client portion of the software system of the invention is preferred for reasons that will be apparent based on this Detailed Description, it will be appreciated by those of skill in the art that the manner in which the various functions are partitioned between the server and the clients can also vary, without exceeding the intended scope of the invention.

With reference to FIG. 1, the process is initiated at START block 101, in response to a potential user contacting the server of the system of the invention over the network using a client messaging device. It is first determined at decision block 102 if the user is already registered to use the messaging system of the invention. If the user is not already a registered user, the potential new user downloads the client portion (sometimes referred to herein as the messaging app) and installs a client portion of software system product of the invention in the form of a messaging app onto the user's client messaging device at block 103. It will be appreciated that downloading of the messaging app could also be made contingent upon a successful registration of the new user.

Those of skill in the art will appreciate that the messaging app of the invention can be downloaded from a remote server, such as a server on which an app store is maintained for purposes of distributing such software application programs from a non-transitory memory medium. The app could also be sourced from, for example, the server of the messaging system of the invention from a web site that can be accessed by potential new users. The messaging app could also be installed by reading it into the memory of the messaging device from a computer disk, a flash drive or some other form of non-transitory computer media. Ultimately, the client messaging app is stored in non-transitory memory of the client messaging device, and is accessed from the memory and executed by a processor to perform the methods of the invention.

A graphical user interface (GUI), can then displayed on the client device. The GUI can be a web page displayed by a browser program stored in memory and executed by the processor, and the user can be prompted to initiate download of the software app to the user's client device through the GUI. A copy of the program code is transmitted over the network from a non-transitory memory accessed by the server, to the non-transitory memory of the client device. As previously mentioned, inputs to the client device through the GUI by the user can be made through a keyboard, a touchscreen and/or by voice if the client device is equipped with a speech recognition user interface.

The software product of the invention is installed into tangible and non-transitory memory of the client device and is executed by one or more processors located on the messaging device configured to execute various methods of the invention as herein described. Messaging devices can be smartphones, tablets, laptops, desk top computers, notebook computers or any other messaging device that is configured with the necessary memory, operating system software and memory necessary to store and execute the messaging app properly.

Those of skill in the art will further appreciate that the client application program product (i.e. the messaging app) installed and running on the client messaging device can be considered to be part of the software system as described above, in that it interacts with another portion of the software program product of the invention that is resident within, and executed by, one or more server devices coupled to the client messaging devices of registered users through a network such as, but not limited to, the Internet. The server portion of the software system product of the invention is also stored in non-transitory memory of the server and is executed by one or more processors of the server. The server portion acts in tandem with the messaging app of the invention running on the client devices. Together, these components of a software system product of the invention program the server(s) and client devices to interact with one another to execute embodiments of methods of the invention as disclosed herein, which in turn form embodiments of the enhanced messaging system of the invention.

With further reference to FIG. 1, in response to a new potential user downloading and installing the client portion of the computer application software system product on the user's client messaging device at block 103, the server responds by initiating a user registration process at block 104 that can require a cellular phone number. Some form of verification (e.g. SMS verification) of the user can be performed at blocks 106-110. At block 106, the server prompts the user for a phone number for a device, such as a mobile telephone device that is available for receiving an SMS text communication over a network. Once received by the device, the user inputs and transmits the number to the server in response thereto through the GUI of the client messaging app. At block 108, the server uses the received contact number to send a code to the messaging device associated with the number provided by the user, and at 110, the server waits to receive the code from the user through the messaging device coupled to the server. It will be appreciated that the device being used for SMS verification can be the same device being used as a client messaging device being employed to access the server of the messaging system, or it can be a different device.

At decision block 110, if the server does not receive the code (the answer is "No"), verification cannot be completed, and operation can be returned to block 104 to re-solicit a contact phone number for the user and verification can repeated until successful. If the correct code is received by the server, verification is a success and operation will move to block 112, where a unique user ID number is assigned and transmitted to the user. Processing then continues at block 113, where further information can be solicited from the user that is necessary for completion of the user's account profile and registration of the user. Registration of the user is completed at block 113 and the profile information is stored in a membership database in association with the unique user identification number assigned to the user. Thus, the unique user ID is associated with the user's completed profile information on non-transitory memory of the server(s).

Those of skill in the art will appreciate that solicitation and receipt of information from the user during registration and verification is typically made through graphical user interfaces (GUIs) that can be supplied by the server as a web page, displayed by a browser program installed on the client messaging device, or through execution of the messaging app itself. The performance of methodologies and processes of the invention as disclosed herein, including the coordinated input, transmission and receipt of solicited information between client and server through the GUIs, is performed between the client device and the server, each under the control of its portion of the computer software system product of the invention.

FIG. 3A illustrates processing flow 300a at the server associated with the registration process for new users, resulting from the server executing the server portion of the software system product of the invention. The processing is initiated when the server is contacted by the new user's client device at block 302 over the network. In response, the server transmits either the entire messaging app to the new user, or provides at the very least, a GUI through which a new user is prompted for, and enters, registration information. This information can include the contact number, through which SMS verification is performed. When the contact number is received at block 304, the server transmits a verification code message to the contact device associated with the contact number. If the code is received back from the user through the messaging device in contact with the server, SMS is deemed verified at 306. The server assigns a unique user ID number to the user at block 308. The server further prompts the user for information by which to complete the registration at 310. Once registration is complete, the user information is stored in the server database as a profile in association with the user's assigned ID number at block 312. If the entire messaging app portion of the software system has not already been transmitted to the user's client messaging device, it is transmitted now. The server then adds a unique entry for the newly registered user in a Contact Object Repository and a Contact Mapping Repository, the purposes of which will be described in more detail below.

Referring back to FIG. 1A, execution of the messaging app by the client messaging device continues at block 114, where a newly registered user is now able to log in to the messaging system of the invention. If a user was already determined to be registered bock 102, then processing will have proceeded directly to block 114 because a "No" answer would have been generated at block 102. The user is solicited at block 114 to log into the messaging system using the verification of credentials established in any manner known to those of skill in the art. Those of skill in the art will appreciate that the log in process is well-known and usually includes at least a prompt for the user's ID Number and a Password. At the server, the credentials are verified and once log in is successful, the user is then considered an "active" (i.e. logged in) participant of the messaging system of the invention.

Processing then continues for the client device as it executes the messaging app at block 116 where, in an embodiment, the user is prompted to add contacts to the user's profile information in one of two ways. Contacts can be added serially by the user (i.e. one contact at a time) with the user providing system ID information unique to each potential contact. The user can also permit the app of the invention to automatically compare a contacts list stored on the user's client device, to the messaging system's registered user database to automatically identify contacts of the user who are also registered users of the messaging system.

If the user does not wish to automatically import all matching contacts from the user's contacts list on the messaging device, the answer at block 116 is "No" and processing continues at block 122, where the user is prompted to add a single contact. If the user wishes to do so, the answer at block 122 is "Yes," indicating that the user as entered a potential contact's ID. Processing then moves to block 124, where the client messaging device generates a contact indicator object (CIO) and transmits it over the network to the server. The CIO can include a field containing the system ID of the requesting user as well as that of the perspective contact. Processing returns to decision block 122 and the process repeats for each single contact the user wishes to add until a "No" answer at block 122 causes processing to continue at block 125 on FIG. 1B, where execution of the client messaging app continues as illustrated in FIG. 1B.

If the user elects to import contacts automatically from the user's contacts list stored on the client messaging device, processing proceeds from decision block 116 to block 118, where a comparison between the user's contacts list and the messaging system's registered user data base is performed. Any identified matches are added as contacts automatically in cooperation with the server by causing the client messaging device to generate and transmit a contact indicator object to the server for each identified match. Processing then continues at decision block 122 where the user is prompted to add contacts serially if desired. If the answer is "Yes," processing moves to block 124, where a contact indicator object is generated and transmitted to the server for each individual contact request as described above. Processing returns to decision block 122 and the process repeats for each single contact the user wishes to add until a "No" answer at block 122 causes processing to continue at block 125 on FIG. 1B, where execution of the client messaging app continues as illustrated in FIG. 1B.

Figure 4:
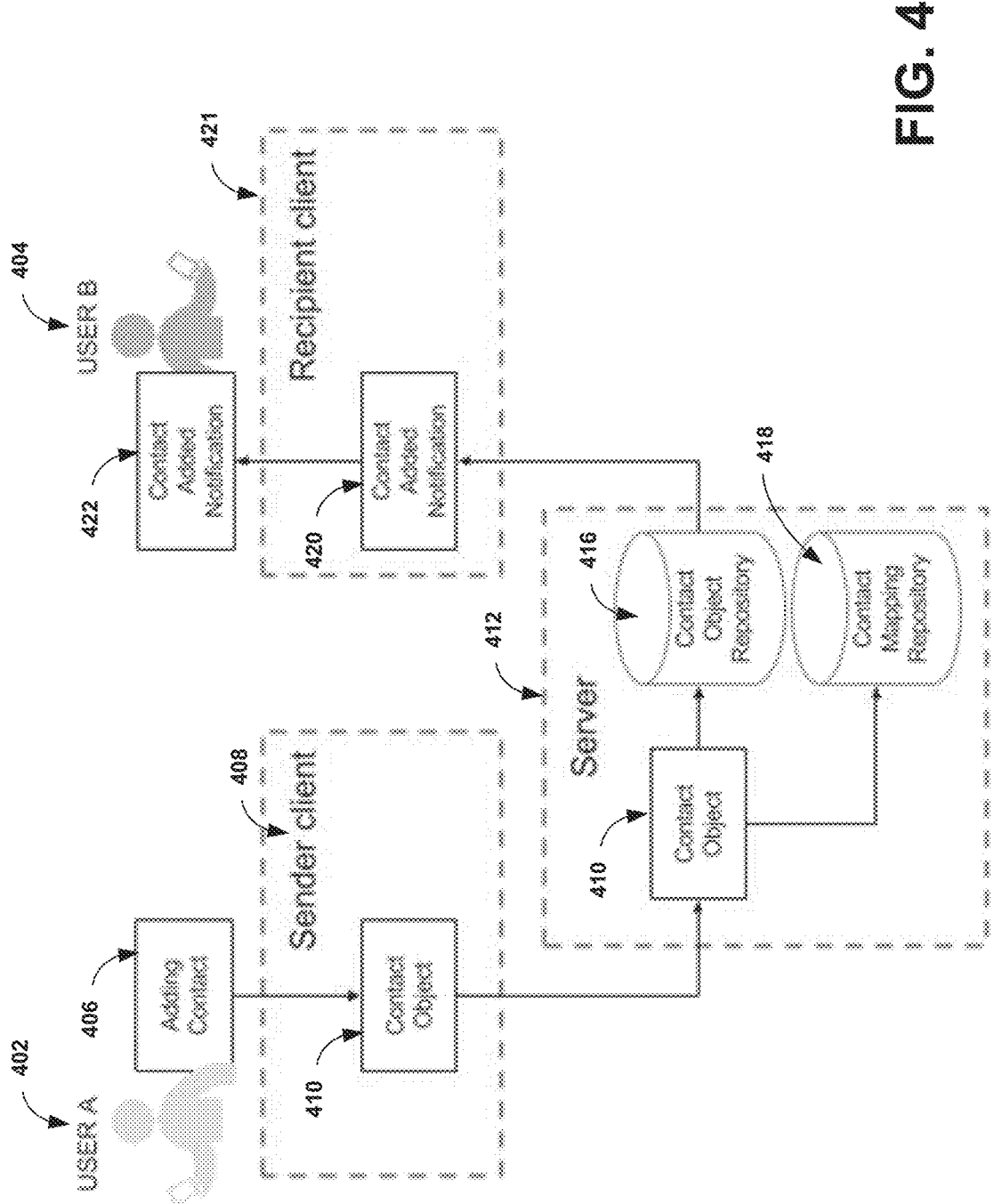
FIG. 4 is a system level diagram illustrating the process of adding users as contacts for other requesting users as a result of the cooperative execution of the software product of the invention in accordance with various embodiments of the invention.

FIG. 4 provides a system level illustration of the process of adding contacts as described above, including an illustration of the processing performed by the server in response to receiving contact indicator objects from the user. In the example illustrated by FIG. 4, User A 402 and User B 404 each have client messaging devices that are coupled to a server 412 over a network (not shown). The client messaging devices of each user are running the messaging app portion of the software system product of the invention.

Figure 1B:
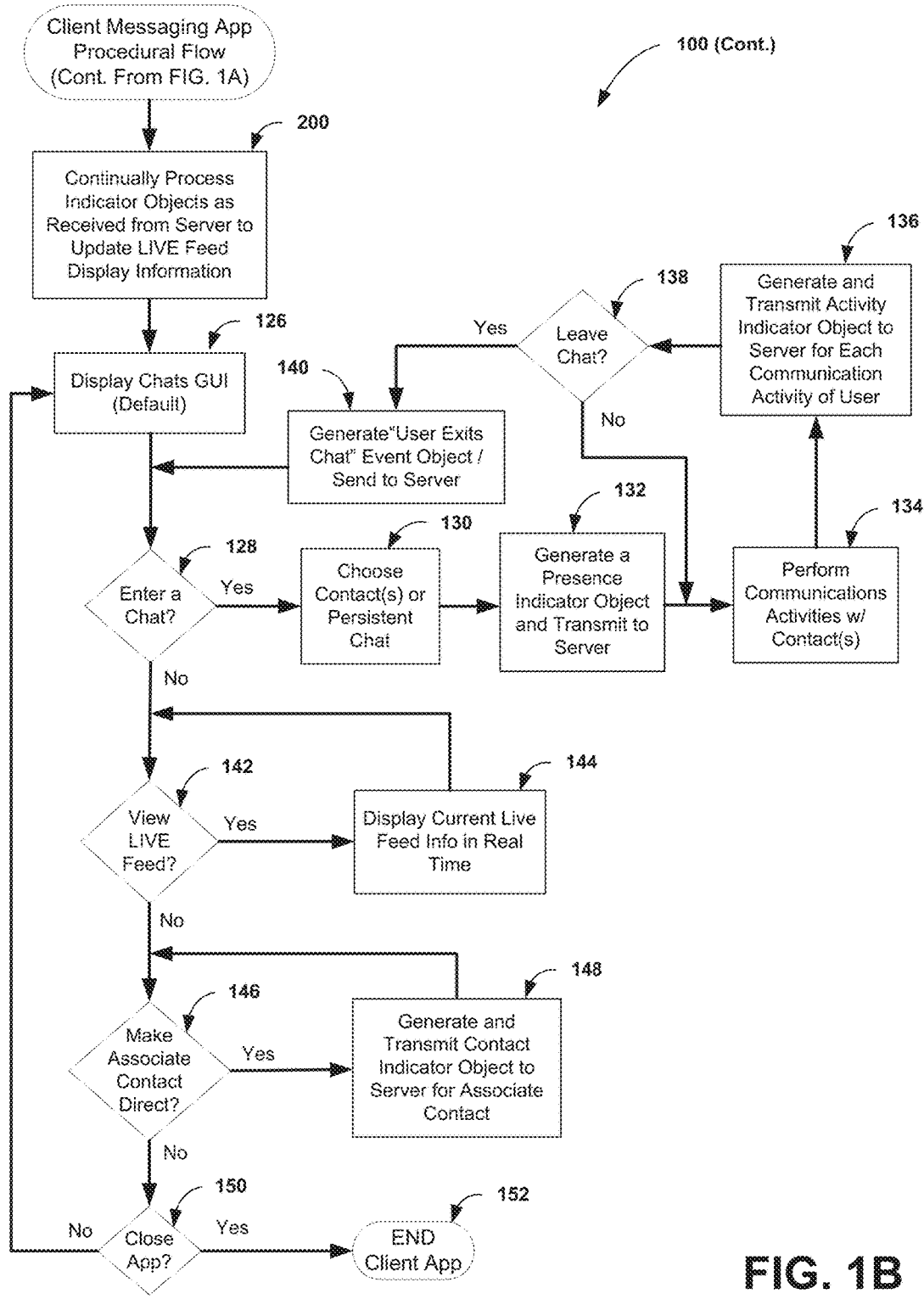
FIG. 1B is a high-level procedural flow diagram illustrating embodiments of methods of the invention performed by a user's client device, the performance of these methods being the result of the execution of the client portion of the computer software system product by the user's client device, the methods including initiating communications activities that generate indicator objects that are transmitted to the server in accordance with various embodiments of the invention.

In the example, User A 402 wishes to add User B 404 as a contact, either from User A's contact list stored on the User A's client messaging device 408, or serially as previously described with respect to flow 100 of FIG. 1A. The process of adding a contact is initiated through an add contact GUI 406, displayed by User A's client messaging device 408 as a result of executing the messaging app, corresponding to either one of blocks 116 and/or 122 of FIG. 1A. The messaging app generates a contact indicator object (CIO) 410 in response to receiving input from User A 402 through GUI 406. The CIO is transmitted over the network to, and received by, server 412. (See blocks 120 and/or 124, FIG. 1A).

As part of the process of adding a contact, the server 412 is executing the server portion of the software system product of the invention in accordance with the high-level flow diagram of FIG. 3B. At block 320 of server flow 300b, the server 412 continuously listens for contact indicator objects (CIOs) received from active users seeking to add contacts as described above. The received CIOs (such as the one generated and sent by User A 402 in FIG. 4) are stored in a unique entry of a Contact Object Repository (COR) 416, the entry being uniquely associated with the sending user (e.g. User A 402) through the sending user's unique ID number.

The CIO (410, FIG. 10) can contain information identifying the sending User A (1004, FIG. 10), which can be for example, User A's assigned unique system ID number. The CIO (410, FIG. 10) can also contain information regarding the identity of added User B 404 (1006, FIG. 10), which can include for example, User B's assigned unique ID number. Thus, the server 412 adds the CIO (410, FIG. 10) for User B 404 to the list of client objects already associated with User A 402, and which are stored in (or removed from, if a contact is deleted) an entry unique to User A in the COR 416 maintained by the server 412. Thus, the data in COR 416 is organized in each user's entry to indicate which users of the system that user has added as a direct contact.

Processing of added contacts from the server's perspective is illustrated by server flow 300b of FIG. 3B. At processing block 320, the server is continuously listening for and receiving CIO's from all users, and each received CIO is stored in the entry in the Contact Object Repository (416, FIG. 4) that is unique to the user who transmitted the CIO. At block 322 of server flow 300b, the server sends a "contact added" notification object (420, FIG. 4) to each user added as a contact by a received CIO. In the example of FIG. 4, User B's client messaging device 421 receives the notification from the server 412. Based on received notification object 420, a displayed message is generated by the messenger app running on the client messaging device of User B as part of a GUI 422, to notify User B 404 of having become a contact of User A 402. It should be noted that User B 404 is now a contact of User A 402, but it is not necessarily true that User A 402 is a contact of User B 404. User B 404 must perform an add contact procedure as described above to add User A to User B's list of contacts.

Figure 5:
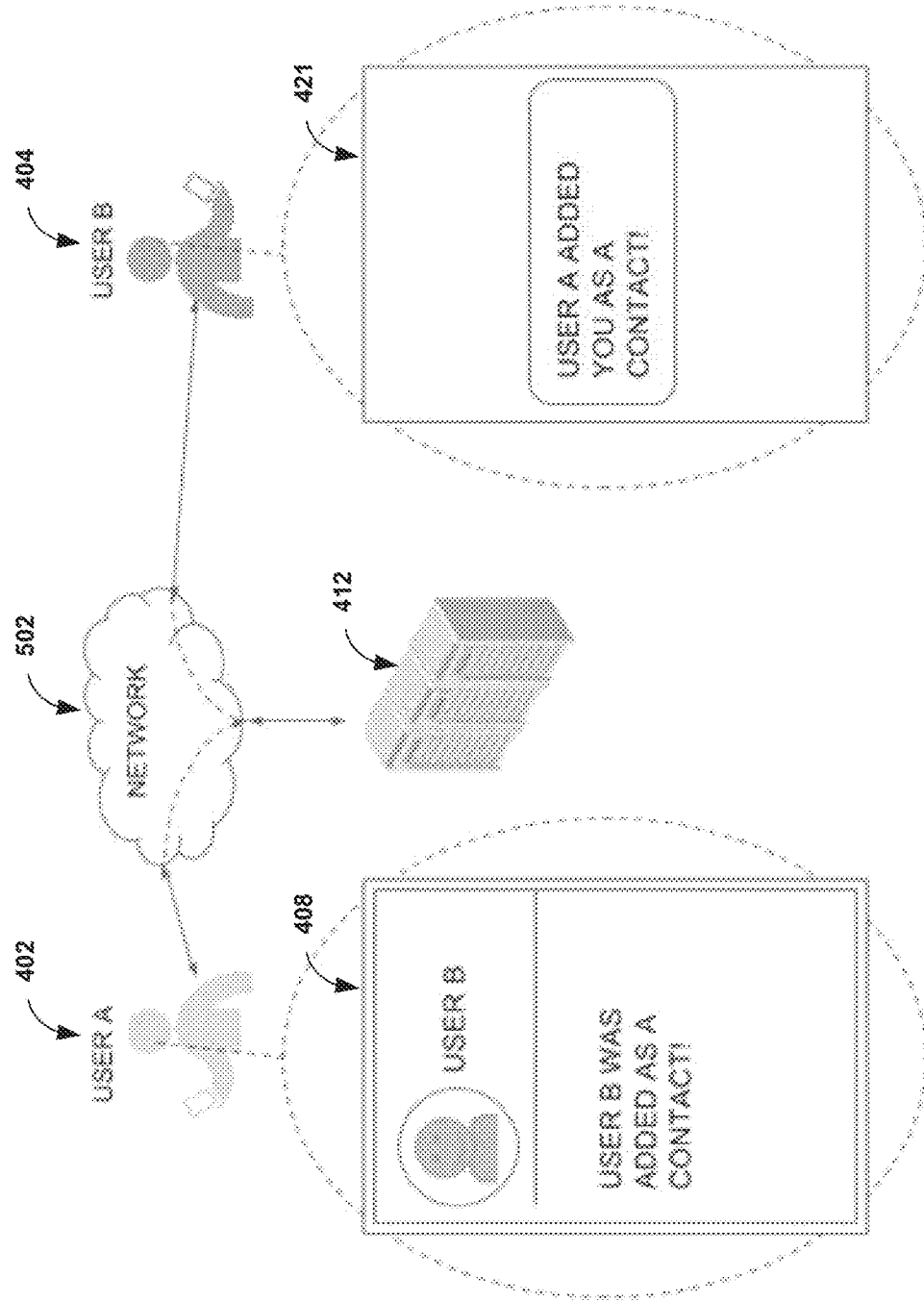
FIG. 5 is a second system level diagram illustrating the process of adding contacts.

FIG. 5 is a network level illustration of the system of the invention as it performs the process of adding User B 404 as a contact of User A 402 as previously described. Client messaging devices 408 and 421 are coupled to the server 412 over network 502 (e.g. the Internet). At block 322, FIG. 3B client messaging device 408 of User A also receives and displays a confirmation object that "User B Was Added as A Contact." Client messenger device 421 is shown displaying the confirmation message that "User A Added You (i.e. User B) as a Contact."

Returning back to the server flow at block 324, FIG. 3B, the server further updates a mapping maintained by Contact Mapping Repository (CMR) 418, FIG. 4 for each CIO (410, FIG. 10) received. Each registered user has a unique entry associated therewith in the CMR 418, and each entry contains all CIOs (410, FIG. 10) generated by a user who has made the user associated with the entry a direct contact. Thus, in the example of FIG. 4, the CIO (410, FIG. 10) sent by User A 402 is also stored in User B's unique entry in the CMR 418. At block 326, a contact mapping is expanded to include CIO's (or at least creating a relational reference thereto) for all users who are direct contacts of the direct contacts of the user associated with the entry. In this way, each user entry now includes a set of all current users who should be receiving as part of their respective LIVE feeds, indicator objects representing the activities of the user associated with the entry. Further detail regarding the manner in which LIVE feed information is generated and processed for transmission by the server, as well as for display of such information by the client messaging device of recipient users, will be presented in more detail below.

With reference once again to processing at the client messaging device described by process flow 100, processing by the messaging app continues from point 127 in FIG. 1A to block 200 of FIG. 1B, where any indicator objects received by the user from the server (in accordance with the map maintained by the Contact Mapping Repository (CMR) 418, are continuously processed to update the user's LIVE feed display information. This display information is preserved and maintained by the user's client messaging device so that at any time, the user may select a LIVE feed display mode to view the LIVE feed in a graphical form on the display of the client messaging device, such as the embodiment illustrated in FIG. 9.

By this process, LIVE feed display information is continuously updated every time there is any change in the status of the communications activity of even one contact or associate contact of the user. The processing of such information for display by the user's client messaging device will be presented in more detail below in conjunction with an Update Live Feed Display Info procedure 200 of FIG. 2A. At this point in the client flow 100, the user is able to engage in various communications activities with any of the user's direct contacts who are logged into the system of the invention.

Messaging app execution continues at block 126, where a Chats GUI is displayed by the messaging app on the client device, through which chats between and among the user's direct contacts may be initiated or joined. If the user wishes to enter a chat at 128, processing moves to 130, where the user may choose a previously active chat that persists in memory of the messaging device (much like one can choose SMS or MMS text from a previously active text thread that persists in a smartphone), or the user can compose a new chat with a contact for which a persistent chat does not exist. The result of joining or initiating a chat at 130 causes the user's messaging device, at block 132, to generate a presence indicator object (PIO) (602, FIG. 10) that is transmitted over the network to the system server. A more detailed description of the processing of presence and other indicator objects (PIOs) will be presented in more detail below.

Figure 6:
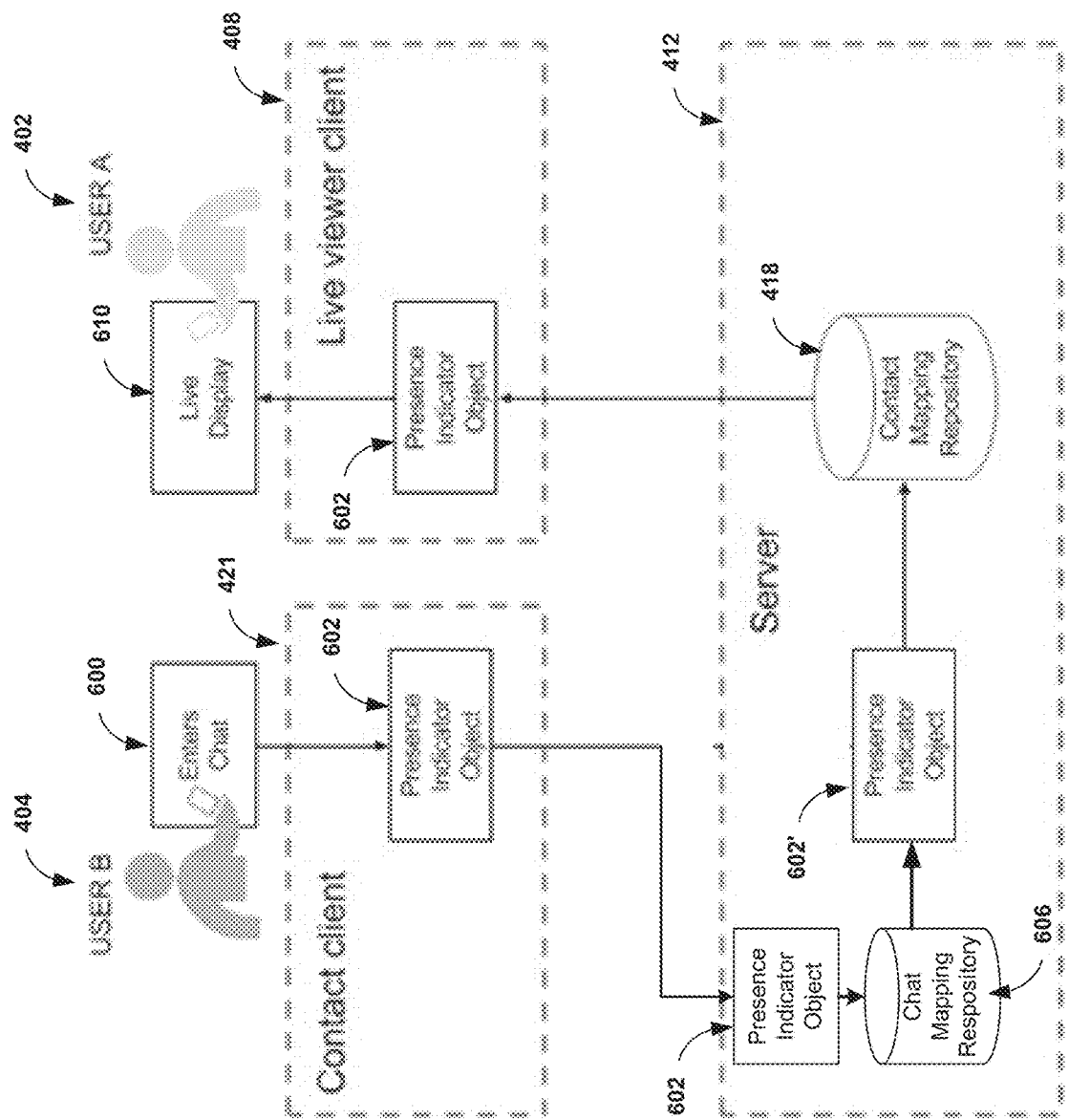
FIG. 6 is a system level diagram illustrating the generation and real-time updating of the LIVE feed status of a user as a result of the user entering a chat in accordance with embodiments of the invention.
Figure 10:
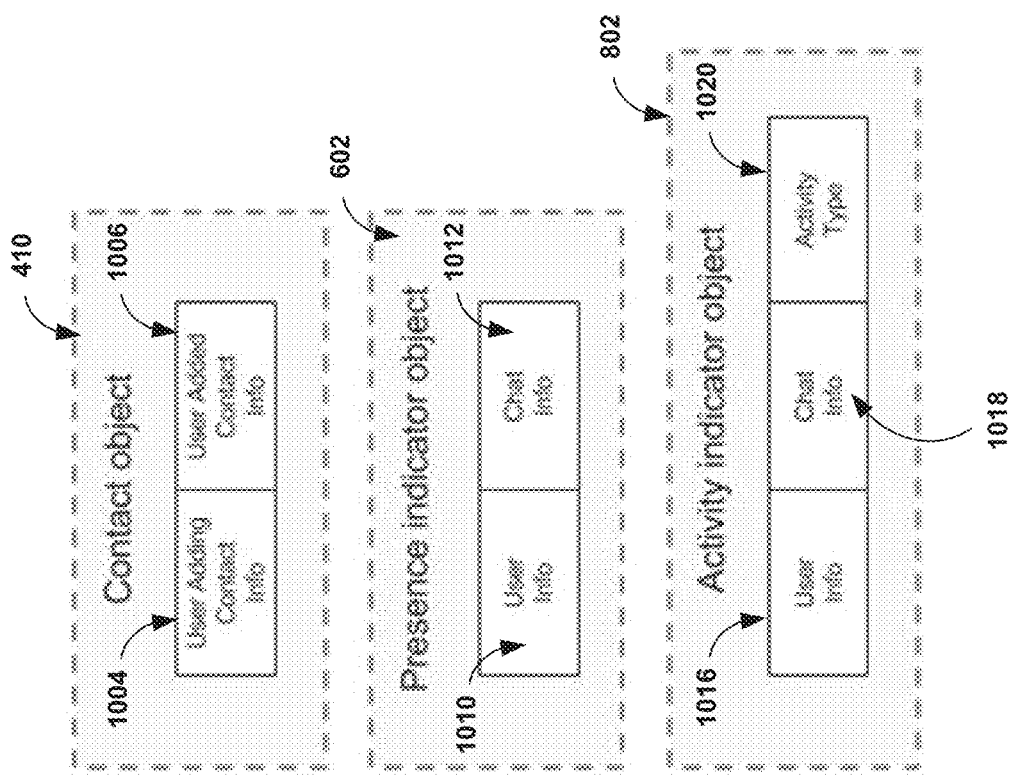
FIG. 10 is a system level diagram illustrating the structural features of various indicator objects in accordance with embodiments of the invention.

FIG. 6 is a system level illustration of a User B 404 using client device 421 currently running the messaging app portion of the software system product of the invention, to enter a chat (see block 126, FIG. 1B) through a chats GUI 600 displayed on the client device 421. PIO 602 is generated and transmitted to the messaging system 412, where it is passed through a Chat Mapping Repository (ChMR) 606. ChMR 606 produces a unique entry for each new chat that is initiated by users of the messaging system of the invention, and assigns a unique Chat ID to each new chat. An embodiment of the PIO 602 is illustrated in FIG. 10. Presence indicator object 602 can have a field 1010 that contains user information for User B 404, including the unique user ID of User B 404. Presence indicator object 602 can also have a field 1012 that contains a chat ID that uniquely identifies the particular chat just entered by User B 404. This field can also include meta data related to the chat, such as when it was initiated, how long it has been inactive, which users have entered and left, and a relational link to where the text of messages exchanged in the chat are stored in the server 412.

The chat information in the presence indicator object 602 is used to update the chat's meta data stored on the server 412. In this way, the server 412 is aware of which chat User B 404 has entered, and the server 412 can update the chat meta data such that any new messages sent within the chat are transmitted to and displayed for that chat on the client messaging devices of the chat participants and User B 404. The text of each new message can be stored for that chat along with all text previously exchanged in the chat, and can be persisted in memory for future reference. The Chat Mapping Repository 606 keeps track of which of the users leave each chat as well.

The PIO 602 from User B is also passed on to the Contact Mapping Repository (CMR) 418, where the PIO 602 is transmitted to all active (i.e. logged in users) that are mapped to User B as direct and associate contacts. In the example of FIG. 6, because User B 404 was previously added as a direct contact by User A 402 as illustrated in FIG. 5, information regarding the fact that User B has entered a chat, in the form of PIO 602 will now be provided to the LIVE feed of User A's client messaging device 408. Thus, when User A chooses to view the LIVE feed on the display of device 408, the fact that User B has entered a chat will be displayed as part of that real-time view of the communications activity of the contacts and associate contacts of User A. A more detailed description regarding how this information is processed for display by a user's client messaging device will be presented below in conjunction with the "Update Live Feed Display Info" procedure 200 of FIG. 2A.

Referring back to the client messaging device, processing proceeds to block 134, where the user can engage in communications activities with his or her direct contacts including typing text, creating a recorded voice message, drawing or writing a message, etc. The user can also receive and display messages received from other direct contacts present in the chat. When doing so, processing proceeds to block 136, where the user's client messaging device generates an activity indicator object (AIO) (802, FIG. 10) that indicates the type of communications activity in which the user is currently engaged. A more detailed description of the various types of indicator objects and their processing will be presented in more detail below. It should be noted that if the user performs no activity other than to monitor the chat, the user's status does not change from the aforementioned state of being in a chat, and no other activity status is created.

Figure 7:
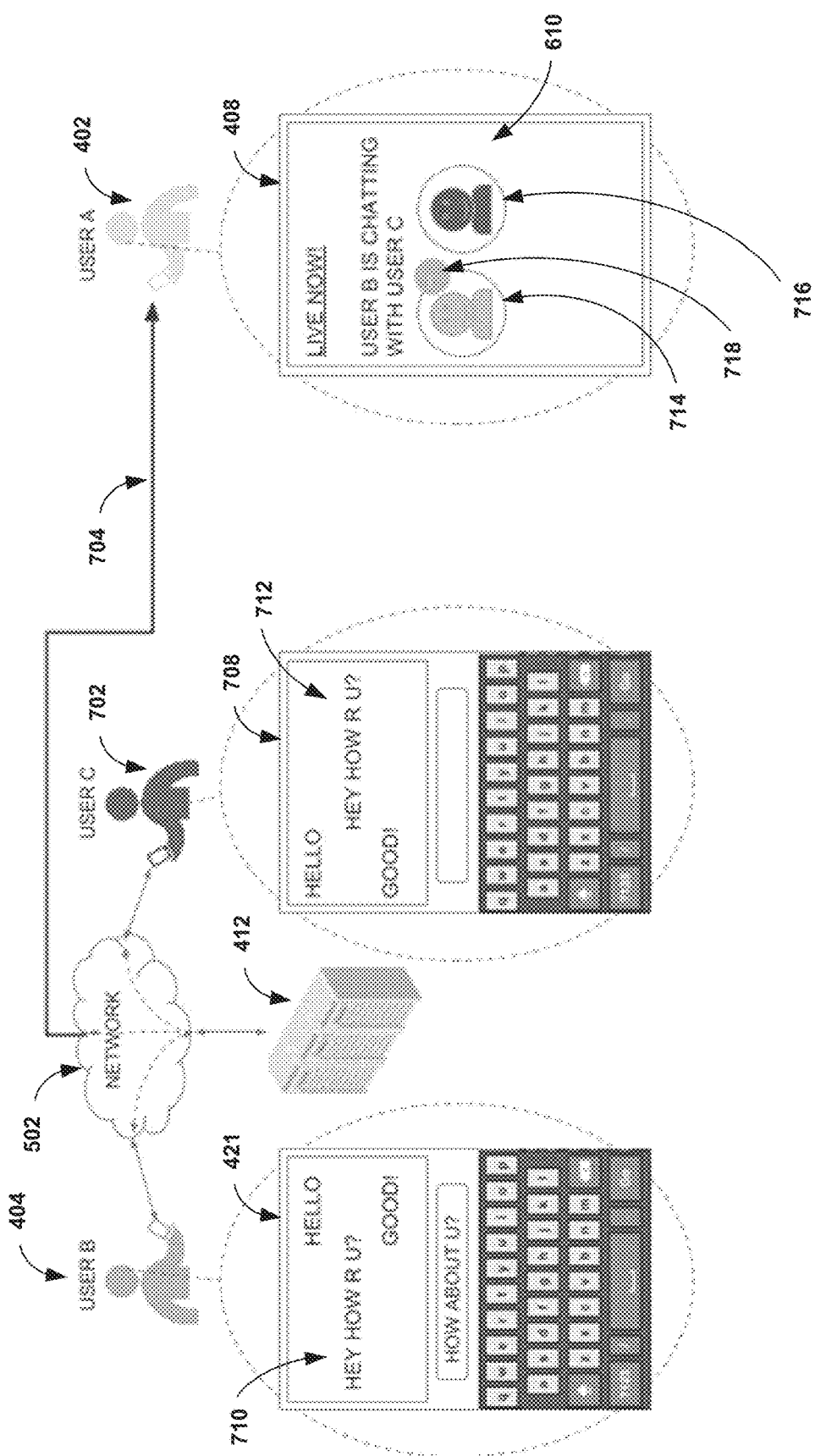
FIG. 7 is a network level diagram illustrating the resulting transmission of a LIVE feed status to one user that represents the communications activities between two other users in accordance with embodiments of the invention.

FIG. 7 is a system level illustration of User B 404 in a Chat with User C 702, who is a direct contact of User B 404. Client device 421 of User B 404 and client device 708 of User C 702 are running the messaging app and displaying the text of the chat on their respective displays 710 and 712, which are coupled to the server 412 over network 502. Because User B 404 is a direct contact of Use A 402, and User C 702 is a direct contact of User B 404, User C 702 is an associate contact of User A 402. Therefore, User A 402 receives as part of a LIVE feed of information used to create display 408, presence indicator objects for User B and User C via network connection 704. The PIO's are used to print user images 714 and 716 to indicate their presence in the chat. Activity indicator object ellipsis image 718, superimposed over the image 714 of User B, is the result of an activity indicator object (AIO) that User A receives as part of User A's LIVE feed to indicate that User B 404 is currently typing more text for the chat.

Figure 8:
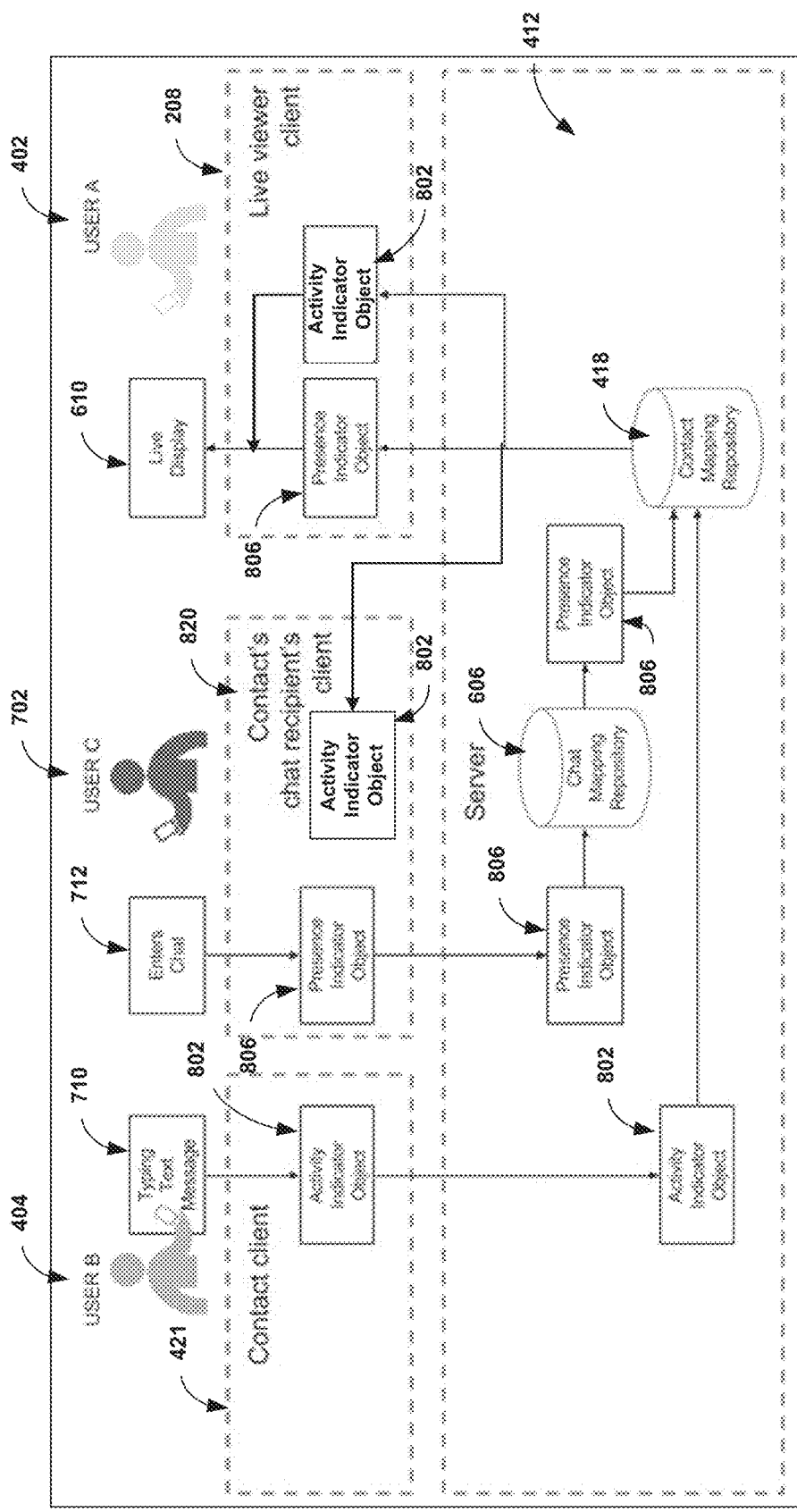
FIG. 8 is a system level diagram illustrating the resulting transmission of a LIVE feed status update to one user representing communications activities between two other users in accordance with the invention.

FIG. 8 illustrates a more detailed systems level view of the results of the processing just described with respect to FIG. 7. User C 702, a direct contact of User B 404 (and thus an associate contact of User A 402), enters the same chat previously entered by User B 404 in FIG. 6. User C enters the chat through GUI 712 displayed on User C's client messaging device 820. As previously described, a presence indicator object (PIO) 806 is generated by User C's client messaging device 820 under control of the messaging app and then transmitted to the server 412.

PIO 806 is passed through the Chat Mapping Repository 606 to identify for the server the chat into which User C 702 has entered, and is then stored in Contact Mapping Repository 812. The map is used by the server to determine to which users PIO 806 should be transmitted as part of their LIVE feed update and PIO 806 is transmitted to those mapped users (i.e. direct and associate contacts of User C 702). As illustrated, User A receives PIO 806 because User C 702 is an associate contact of User A 404 (User B is a direct contact of User A and User C is a direct contact of User B). The presence of Users C 702 and User B can then be displayed 610 on the client messaging device 208 of User A.

As User B types text to be sent to User C and any other user that may be present in the chat, an activity indicator object (AIO) 802 is generated and transmitted over the network to the server 412. The AIO 802 is routed directly to the CMR 418 and is transmitted by the server to all users who are mapped to User B by the CMR. Thus, Users A and C will both receive the AIO 802 as part of each user's unique LIVE feed update from the server 412. In the example of FIG. 8, User A is viewing the LIVE feed, and thus receipt of AIO 802 will be reflected immediately in the displayed information. User C is viewing the chat GUI, and thus will be stored as an update User C's LIVE feed information, and will be reflected when User C selects LIVE feed for display at a later time.

An embodiment of an activity indicator object 802 is illustrated in FIG. 10. In an embodiment, the AIO 802 has three fields. Fields 1016 and 1018 are for user ID information and chat ID information respectively, similar to the presence indicator object PIO. The AIO further includes an activity type field 1020 that indicates or decodes to display the type of communication activity in which the user is currently engaged that led to the generation of the AIO 802.

The text that is being typed by User B is displayed on User B's client device 421 and under command of User B, is then transmitted to the server 412. The server then stores the text in association with the chat ID and then forwards the text to only those contacts who have entered, and are therefore present, in the chat with User B. In the example of FIG. 8, the data is received by and displayed on User C's messaging device 802.

Processing at the client messaging device through continued execution of the messaging app continues as previously described as long as, at block 136, FIG. 1B, the user chooses to remain in the chat. If the user decides to leave the chat at decision block 138, which can occur by navigating away from, or deleting the chat on the chat GUI, or signing off of the messaging system entirely, an event indicator object (EIO) is generated and transmitted to the server at block 140 to indicate the user's departure from the chat. The user's presence is then removed from the chat information in the Chat Mapping Repository (ChMR) 606. The EIO is also sent to the direct and associate contacts of the user leaving the chat to update the LIVE feed information to remove the user's presence in that chat.

FIG. 3C illustrates an embodiment of a flow at the server 412 for processing indicator objects as previously described, to generate LIVE feed updates for all active users of the messaging system of the invention. At block 350, server 412 is listening for indicator objects coming in from client messaging devices users over the network. Processing at block 352 determines if a received indicator object is a chat event indicator object, which define events such as when a user creates or enters a chat, or when a user exits a chat. If "Yes," the object is first routed through the Chat Mapping Repository 606, FIG. 8 to update the meta data for the chat identified by the indicator object at block 354.

Processing continues at block 356 where all received indicator objects are provided as inputs to the Contact Mapping Repository 418. The server uses the user ID stored in each indicator object to look-up and access the map from the contact mapping repository 418 for the user associated with the user ID. This provides the set of users to whom the received activity object should be sent as part of their LIVE feed update. This mapping includes both the direct and indirect contacts of the user who sent the activity object. At block 360, the server sends the indicator object to only those users in the mapping who are currently logged in and active. This will eliminate unnecessary traffic over the network. The foregoing process is repeated for each indicator object received over the network. Those of skill in the art will appreciate that multiple servers may be employed in parallel to handle a growing number of users. Thus, the indicator object is transmitted by the server to all users who for whom the user who sent the PIO is a contact.

It should be noted that when a user first becomes active upon log in at 114, server 412 makes an immediate push to the user of all of the current state of activity for the user's entire set of contacts and associate contacts so that LIVE feed information is available for display by the user. In an embodiment, once the current state of the LIVE feed information is transmitted, the server 412 needs to update only those changes that occur to each user's LIVE feed (as indicated by newly received contact, activity and presence objects), thus maintaining the lightest possible impact on traffic over the network.

Processing at the client device continues at Block 142, where the user can choose the LIVE feed view, in which case the continuously updated LIVE feed data is converted to visual information and displayed on the user's messaging device at block 144. A more detailed description of the process flow for displaying the LIVE feed information being received at block 200 will be presented in more detail below with reference to FIGS. 2A-B.

In an embodiment, if the user wishes to make a user a direct contact, who is currently displayed as an associate contact in the user's LIVE feed, the associate contact can be selected on the LIVE feed display and processing moves to 146. At 146, a contact indicator object is generated and transmitted to the server at block 148. Thus, User A 402 in the examples of FIG. 7 or 8, can make User C 702 a direct contact from LIVE feed display 408, and the server processes the contact indicator object as previously described. Processing through execution of the messaging app can be terminated at block 150 by the user closing the app. Otherwise, the user can continue to move back and forth between the various display modes as previously described.

As previously discussed, in parallel with processing of chat activities, new indicator objects representing the various communications activities of the user's direct and associate contacts are being continuously received at block 200 as transmitted from the server. They are then processed into display information representing the user's LIVE feed that can be displayed on the user's messaging device whenever the LIVE feed display mode is selected by the user at block 142, FIG. 1B. Further details regarding the processing for display of the indicator objects are now presented with reference to FIGS. 2A-B.

Figure 2A:
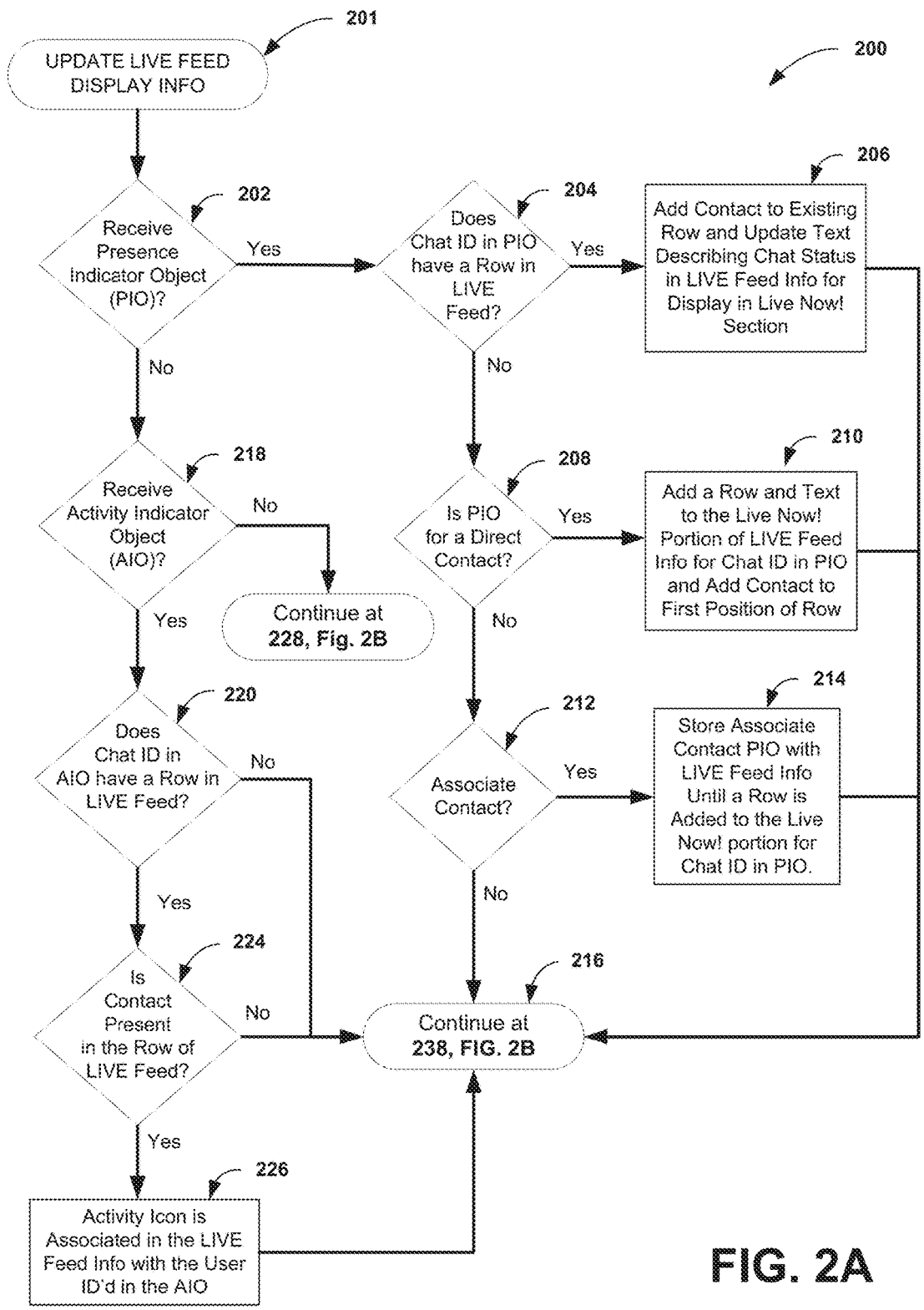
FIGS. 2A-B combine to illustrate a high-level procedural flow diagram illustrating the execution of a called procedure of the client portion by a user's client device to process indicator objects received from the server that can be used to display in real time a LIVE feed representing the various types of communications activities being conducted by the user's direct and associate contacts.
Figure 2B:
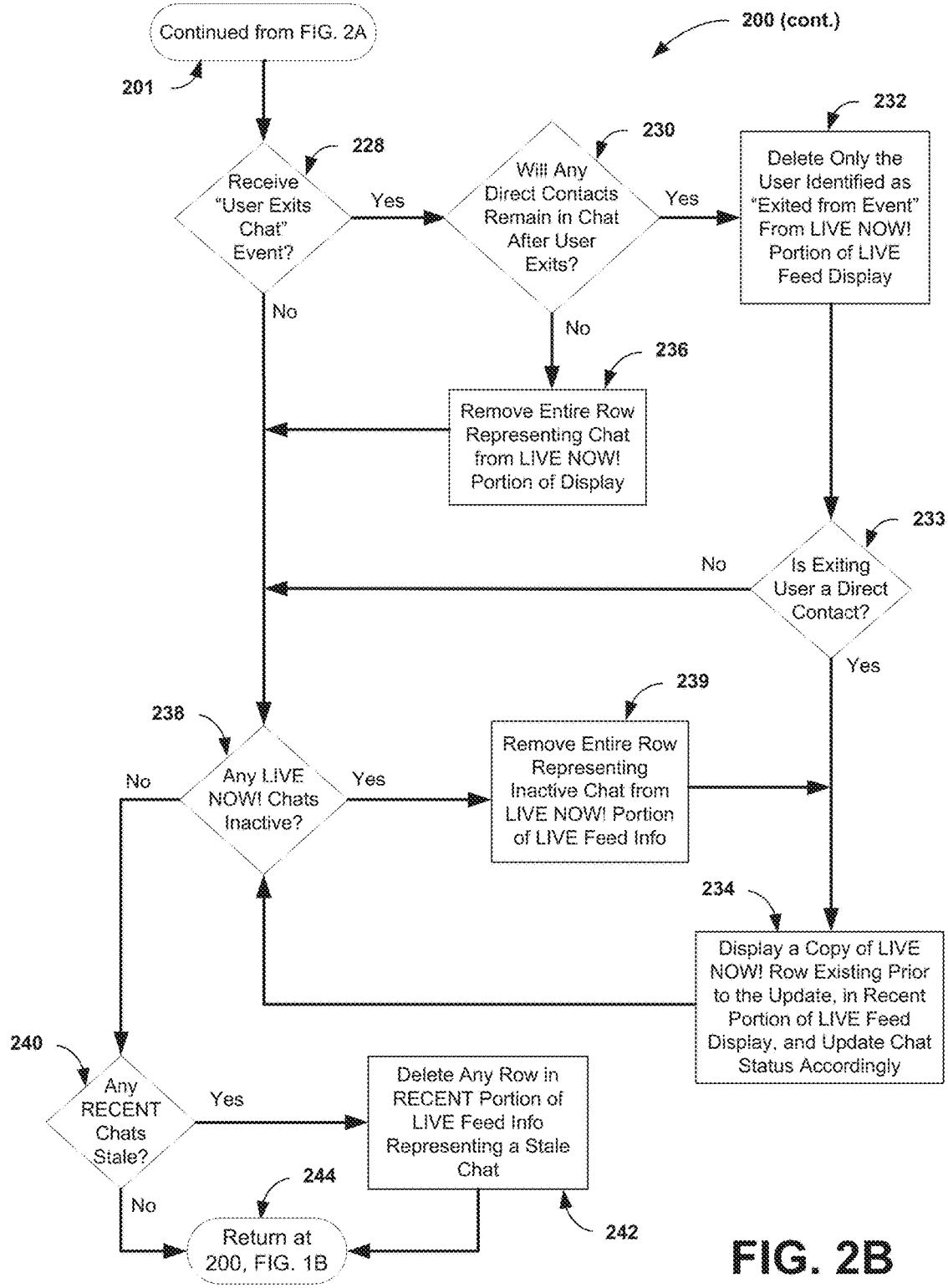

Every time a new indicator object is received from the server at block 200, FIG. 1B, it is processed in accordance with the "Update LIVE Feed Display Info" flow 200 of FIG. 2A-B, starting at 201. At 202, it is determined if the received indicator object is a presence indicator object (PIO) as previously described. If "Yes," it is then determined at block 204 if there is already established by the LIVE feed information, a row that will be displayed in the user's LIVE feed for the chat identified by the chat ID embedded in the PIO. If the answer is "Yes," user information for the contact is added to that already existing row for that chat, and the contact user will be displayed in the user's LIVE feed display (when selected for display by the user) as having entered the chat. Once the user information is added to the LIVE feed information, processing returns to, and then continues from block 200, FIG. 1B until another indicator object is received.

Figure 9:
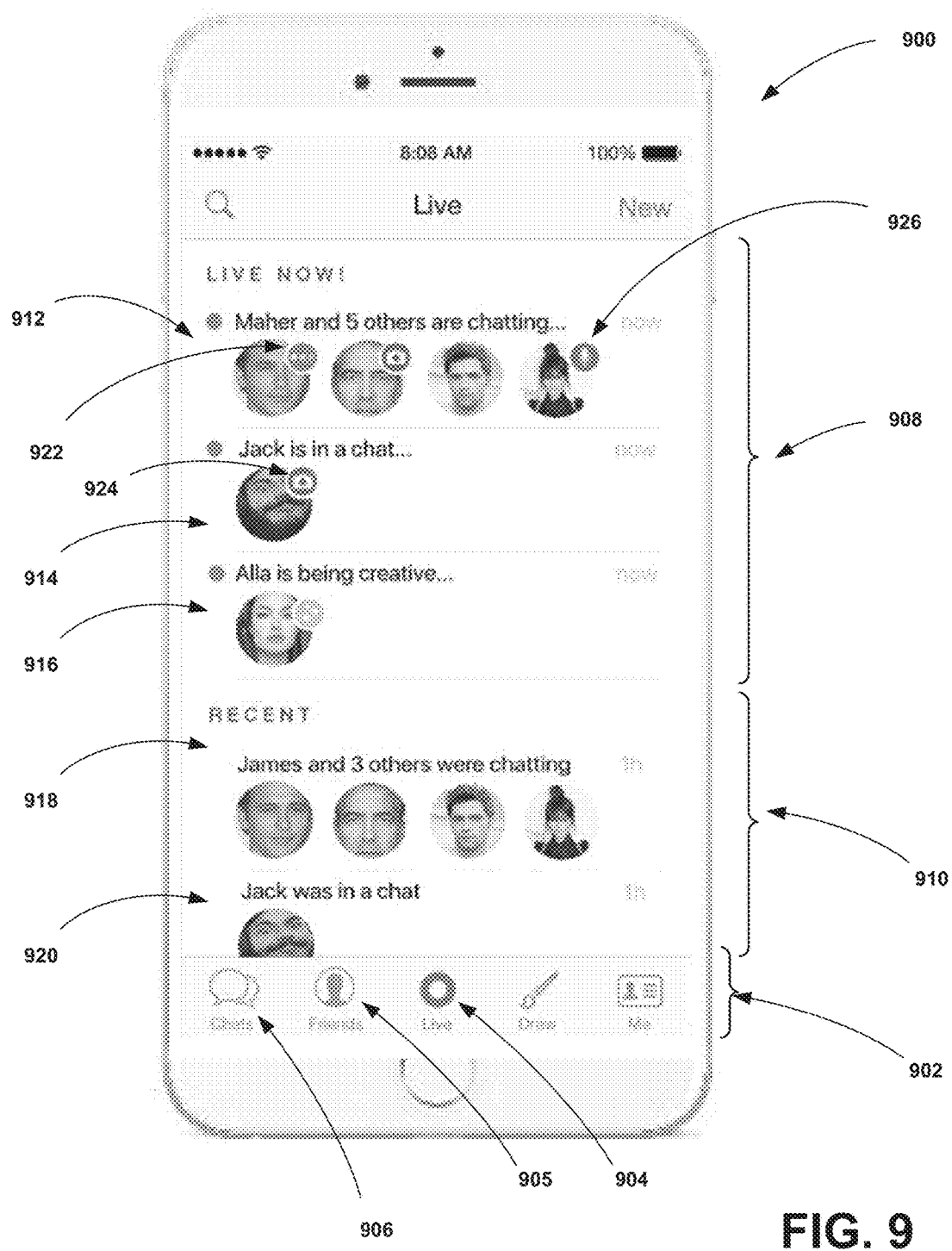
FIG. 9 is a view of a LIVE feed displayed on a user's client messaging device in accordance with embodiments of the invention.

Referring to FIG. 9, a client messaging device 900 that is executing the messaging app is illustrated in the LIVE feed display mode, and is displaying an embodiment of the LIVE feed display GUI. The LIVE feed display mode has been selected by the user through activation of the Live button 904 presented to the user as part of the messaging app GUI. Thus, the LIVE feed information that is constantly maintained by the client messaging device while logged into the system of the invention is, when the LIVE feed is selected, used to generate the LIVE feed display as part of the GUI. In an embodiment, the display is split into two sections. The "LIVE NOW!" section 908 displays current activity of the user's contacts, while the "RECENT" section 910 displays previous activity of the user's contacts for some predetermined time following the ceasing of such activity.

Consistent with the discussion of the processing flow 200 above, if the row 912 already exists in the LIVE NOW! portion of the LIVE feed information to represent the chat when the new PIO is received, then only the presence of an additional user will be added to the existing row. As can be seen, the user information embedded for the user sending the PIO includes information for displaying a picture of the user from the user's system profile. In addition, text regarding the status of the chat (e.g. "Maher and 5 others are chatting . . . ") is also provided and must be updated based upon the addition of another user contact joining the chat.

Referring back to the flow 200 of FIG. 2A, if the answer at block 204 is "No," it is determined at block 208 if the PIO is from a direct contact as opposed to an associate contact. If the answer is "Yes," process continues to block 210, where a new row is added to the "LIVE NOW!" portion of the LIVE feed information maintained by the client messaging device to visually represent the chat identified by the chat ID embedded in the PIO. The user, who is a direct contact of the user receiving the LIVE feed information, is then added to the new row and a textual status for the chat is created as well. Referring to FIG. 9, an example of this could be row 914, where Jack has entered a chat that no other user has entered that is also a direct or associate contact of the user receiving and viewing the LIVE feed.

If the answer at block 208 is "No," then it is determined if the user that sent the PIO is an associate contact of the user receiving the LIVE feed information. If the answer is "Yes," then processing proceeds to block 214, where the information is saved as part of the LIVE feed information until a row is added for the chat identified with the PIO. Thus, in an embodiment, the user receiving the LIVE feed only sees associate contacts when they are in a chat with the users who are direct contacts of the user receiving the LIVE feed. The status of the associate contact is retained as part of the current LIVE feed information and, is added to the LIVE feed display only after a direct contact enters the chat. With reference to FIG. 9, if Maher is a direct contact of the user receiving the LIVE feed information, and the others in row 912 are associate contacts, no row will be displayed and therefore no status of any of the associate contacts will be displayed until Maher enters the chat. The status of the associate contacts will still be maintained as part of the user's LIVE feed information until such time as Maher joins the chat, so that the most up-to-date status for the associate contacts can be displayed immediately as part of the upon added row.

After processing is completed at block 214, processing returns to block 200 of FIG. 1B and continues from there. If the answer at block 212 is "No," processing also returns to block 200 of FIG. 1B, because the PIO is somehow embedded with a user ID who is not (or is no longer) a contact of the user receiving the LIVE feed.

If the answer at block 202 of FIG. 2A is "No," processing continues at block 218, where it is determined if the received activity indicator is an Activity Indicator Object (AIO). If "Yes," then it is determined at block 220 if a row has been established for the LIVE feed display for the chat ID embedded within the AIO. If the answer at 220 is "No," processing returns to block 200 of FIG. 1B and continues from there. This result would likely be an AIO from an associate contact who is in a chat without a direct contact of the user receiving the LIVE feed. Again, the AIO will be maintained in the LIVE feed information in the event that such a direct contact enters the chat, triggering display of the associate contact's status information in the LIVE feed display.

If the answer at block 220 is "Yes," it is then verified at block 224 that the user corresponding to the embedded ID in the AIO is in fact present in the row created for the chat. If the answer is "No," processing returns to block 200 of FIG. 1B and continues from there. If the answer is "Yes," processing continues at block 226 where the activity code embedded in the AIO is associated with the current LIVE feed information maintained by the client messaging device, and which in an embodiment, is displayed as an icon representing the activity in which the contact user is currently engaged. If and when the user receiving the LIVE feed information chooses to display the LIVE feed such as in FIG. 9, the activity icon will be displayed in associative proximity to the contact user in the row displayed for the chat. As illustrated in FIG. 9, Maher in row 912 is typing, as represented by ellipsis icon 922. Jack can be taking or attaching a photograph to send as part of the chat represented by row 924, which is represented by the camera icon 924. The last user contact in row 912 can be recording a message or attaching a recorded message to the chat represented by row 912, which is indicated by the microphone icon 926. Those of skill in the art will recognize that any number of activities can be represented by such activity icons as such functions are added or expanded in complexity.

Referring back to the flow 200 of FIG. 2A, if the answer at block 218 is "No," processing represented by flow 200 continues to block 228 of FIG. 2B. At block 228, it is determined if the received indicator object is an event indicator object EIO that is generated and sent by a user's client messaging device when the user affirmatively exits a chat. In an embodiment, the EIO is similar in format to other activity indicator objects, including a field for identifying the user leaving the chat, as well as the chat ID for the chat being vacated by the user. If "Yes," it is determined at block 230 if any other direct contacts of the user receiving the LIVE feed still remain in the chat just vacated by the contact associated with the event indicator object. If "Yes," processing continues at block 232 where the contact identified by the EIO is removed from the "LIVE NOW! portion of the LIVE feed information that defines the row currently representing the chat identified within the EIO.

Processing then continues at block 233, where it is determined if the exiting user is a direct contact of the user receiving the EIO as an update to his/her LIVE feed information. If "Yes," processing then proceeds to block 234, where a copy of the row representing the status of the chat prior to the removal of the exiting direct contact, is generated to be displayed in the "RECENT" portion of the LIVE feed information and display. In an embodiment, the text describing the exiting contact's status would then read that the exiting user WAS in a chat. Once the LIVE feed information has been updated as described, processing returns back to block 200 of FIG. 1B and processing continues from there until another indicator object is received.

If the answer at 233 is "No" because the exiting contact is an associate contact of the user receiving the LIVE feed, then in an embodiment, no information regarding the associate contact is provided in the "RECENT" portion of the LIVE feed information and/or display. Those of skill in the art will appreciate that in other embodiments, recent activity of associate contacts may also be included if desired, eliminating the need for block 233. However, it will be appreciated that there can be advantages to limiting the "RECENT" portion of the LIVE feed information to only direct contacts of the user receiving the LIVE feed updates.

If the answer back at block 230 is "No," the entire row is removed from the LIVE feed display because no direct contacts of the user will remain in the chat. As before, the current status of any associate contact remaining in the chat will be maintained in the LIVE feed information in the event that a direct contact of the user enters the chat at some point in the future. However, until then, the information will be suppressed and not displayed by the messaging app whenever LIVE feed display mode is selected by the user.

If the result at blocks 228, 230 or 233 are "No," processing will continue at block 238 where it is determined if any chats already represented with rows in the LIVE NOW! portion of the LIVE feed have become inactive for some predetermined period of time. This can result, for example, based on the absence of text or other communications occurring between any of the chat participants, and no new users entering the chat for that predetermined period of time. If that occurs, the answer is "Yes" at block 238 and processing continues at block 239 for all such rows identified as inactive. At block 239, the row is removed from the LIVE NOW! portion of the LIVE feed display information, and is displayed in the "RECENT" portion at block 234 with an appropriate update to the text reflecting that the current status of the chat is inactive.

Processing then proceeds back to block 238, where once again it is determined if any chats still represented in the LIVE NOW! section of the LIVE feed information are currently inactive. If "No," processing continues at block 240 where it is determined if any of the chats currently represented by rows in the "RECENT" portion of the LIVE feed information have become stale by remaining in the "RECENT" portion for some predetermined time. If "Yes," processing continues at block 242, where all rows identified as stale are deleted from the "RECENT" portion of the LIVE feed information and are therefore no longer displayed by the client messaging device. Processing via the execution of the client messaging app then proceeds back to block 200 of FIG. 1B and continues from there as previously described.

It should be pointed out that if a chat is removed from the LIVE NOW! portion of the LIVE feed information and moved to the RECENT portion due to inactivity through blocks 238, 239 and 240 of FIG. 2B, any communications activity by a direct contact (indicated by generation of any indicator objects as previously described), will in a sense revive the chat back to active status and the row will be re-established in the LIVE NOW! portion of the LIVE feed information. It will be appreciated that in an embodiment, the inactive version of the chat can be deleted from the RECENT portion of the LIVE feed information and a current version, or in another embodiment, it can remain there until it becomes stale.

As illustrated in FIG. 9, rows 918 and 920 displayed in the "RECENT" portion 910 of a user's LIVE feed display GUI provide previous activity on the part of the user's direct contacts, James and Jack, respectively. These rows are there because either James and/or Jack left the chats affirmatively, or because the chats became inactive passively.

Some examples of various active chat status scenarios that can be displayed with a row in the LIVE NOW! portion of the LIVE feed include:

User A in a group chat, but alone: "Frank is chatting in a group . . . "

User A in a group chat with x people: "Frank and 5 others are chatting . . . "

User A in a single chat alone: "Frank is in a chat . . . "

User A in a single chat with 1 person: "Frank is chatting with Sue . . . "

Some examples of various active chat status scenarios that can be displayed with a row in the RECENT portion of the LIVE feed include:

User A in a group chat alone: "Frank was chatting in a group"

User A in a group chat with x people: "Frank and 3 others were chatting"

User A in a single chat alone: "Frank was in a chat"

User A in a single chat with 1 person: "Frank was chatting with Kelly"

Those of skill in the art will appreciate that the messaging system of the invention generates and transmits in real time current LIVE feed that is unique to each user of the messaging system, and that represents the real-time communications activity of the direct contacts and associate contacts of each and every active user of the messaging system. This is accomplished through execution of a software system computer program product that includes a client messaging app portion of which is executed by each user's client messaging device, and a server portion of which is executed by server device in cooperation with the user's client messaging devices processing the app portion.

Execution of the client messaging app portion causes each user's client messaging device to generate and transmit indicator objects in association with various communications activities conducted by the user over the messaging system. The messaging further listens for and receives a steady stream of indicator objects from the user's contacts and associate contacts as transmitted by the server. The messaging app is further configured to process and execute the received LIVE feed information and to display it in the form of a LIVE feed GUI when instructed by the user through the client messaging device.

Execution of the server portion permits the server to receive such indicator objects, and to generate and update a map in real-time that identifies which users are to receive each user's generated indicator objects. In this way, each user has the feel of being in a common room with all of the user's contacts, and able to visually observe their interactions with other members of the community also present in the same place.

One of skill in the art will appreciate that by generating and transmitting a real time, continuously updated feed of the communications activities of a user's contacts and associate contacts to the user's client messaging device, an experience can be emulate much like the feeling of walking into your local coffee shop and spotting a friend unexpectedly. One is able to get the contact user's attention and spark a conversation. It's unplanned and pleasant—it's serendipitous—and it's an enjoyable experience. The real-time, ephemeral nature of the Live feed, unique to each user, makes the information compelling and valuable to a user, even though the participants are remote.

What is claimed is:

1. A method of enhancing network messaging among a community of users using a messaging service over a communications network, by providing to each active user of the community a personalized live feed that visually represents the current communications activities of other users over the network who are personal contacts of the active user:

providing at least one server coupled to the network, the server configured to be accessed over the network by messaging devices operated by the users of the community;

for each user of the community, continuously maintaining a unique mapping between each user and all other users of the community that are currently personal contacts of the user; and continuously generating a live feed for each user of the community who is actively using the messaging service, said generating further comprising:

continuously receiving indicator objects using the server, the indicator objects being generated and transmitted over the network by the messaging devices of the users, the indicator objects being representative of the communications activities in which each generating and transmitting user is currently engaged while using the service, each of the indicator objects being uniquely associated with the user whose messaging device has generated and transmitted them; and for each indicator object received by the server:

accessing the unique mapping for the user uniquely associated with the received indicator object, and transmitting back over the network an instantiation of the indicator object to each of the active users who are mapped to the user associated with the received object by the accessed mapping, the continuously transmitted instantiations of each indicator object forming a personal live feed for each user that can be used by the user's messaging device to display a visual representation of the current communications activities of the user's contacts in real time.

2. The method of claim 1 further comprising:

identifying each user of the community with a unique identification (ID) number; and providing software instructions from the server to each user's messaging device, the software instructions for configuring the messaging device to:

generate indictor objects when engaging in communications activities using the messaging service; and embed each generated indicator object with the user's unique ID number.

3. The method of claim 2 wherein the software instructions further configure the messaging device to:

store the received indicator objects transmitted from the server as part of a current live feed, discard any previously stored received indicator objects rendered obsolete by newly received indicator objects; and continuously display the current live feed on the messaging device when a live feed display mode is enabled by the user.

4. The method of claim 3 wherein the live feed includes a portion that represents current communications activities of the user's direct contacts and associate contacts, and a recent portion that represents previous communications activities for direct contacts.

5. The method of claim 1 wherein the contacts of each user include direct contacts that are established by the user.

6. The method of claim 5 wherein the contacts of each user further include associate contacts who are direct contacts of each of the user's direct contacts.

7. The method of claim 6 wherein the mapping for each user is maintained in a contact mapping repository by the server.

8. The method of claim 7 wherein the mapping for each user in the contact mapping repository is updated each time a user is added or deleted from the community, and each time a user adds or removes another user to or from the user's contacts.

9. The method of claim 1 wherein:

the messaging service facilitates chats between users of the community, each of the chats being assigned a unique chat ID, and wherein when a user enters a chat, the user's messaging device generates and transmits a presence indicator object to the server over the network, the presence object indicator including the user's ID and the chat ID embedded therein.

10. The method of claim 8 wherein when the user engages in communications activities in the joined chat, the user's messaging device generates an activity indicator object that includes the chat ID, the user's ID and an activity type unique to the activity in which the user is engaged.

11. A system for enhancing network messaging among a community of users of a messaging service over a communications network, the system providing to each user of the community a personalized live feed that visually represents the current communications activities of other users over the network who are personal contacts of the active user, said system comprising:

a communications network; and at least one server configured to be accessed over the network by messaging devices operated by the users of the community, the server configured to:

for each user of the community, continuously maintain a unique mapping between each user and all other users of the community that are currently personal contacts of the user; and continuously generate a live feed for each user of the community who is actively using the messaging service, said generating further comprising:

continuously receive indicator objects, the indicator objects being generated and transmitted over the network by the messaging devices of the users, the indicator objects being representative of the communications activities in which each generating and transmitting user is currently engaged while using the service, each of the indicator objects being uniquely associated with the user whose messaging device has generated and transmitted them; and for each indicator object received by the server:

access the unique mapping for the user uniquely associated with the received indicator object, and transmit back over the network an instantiation of the indicator object to each of the active users who are mapped to the user associated with the received object by the accessed mapping, the continuously transmitted instantiations of each indicator object forming a personal live feed for each user that can be used by the user's messaging device to display a visual representation of the current communications activities of the user's contacts in real time.

12. The system of claim 11 wherein the server is further configured to:

assign a unique identification (ID) number to each user of the community; and provide software instructions over the network to each user's messaging device, the software instructions for configuring the user's messaging device to:

generate indictor objects when engaging in communications activities using the messaging service; and embed each generated indicator object with the user's unique ID number.

13. The system of claim 12 wherein the software instructions further configure the user's messaging device to:

store the received indicator objects transmitted from the server in the form of a current live feed, discard any previously stored received indicator objects rendered obsolete by newly received indicator objects; and continuously display the live feed on the messaging device when a live feed display mode is enabled by the user.

14. The system of claim 13 wherein the live feed includes a portion that represents current communications activities of the user's direct contacts and associate contacts, and a recent portion that represents previous communications activities for direct contacts.

15. The system of claim 11 wherein the contacts of each user include direct contacts that are established by the user.

16. The system of claim 15 wherein the contacts of each user further include associate contacts who are direct contacts of each of the user's direct contacts.

17. The system of claim 16 wherein said identifying is performed by a contact mapping repository maintained by the server.

18. The system of claim 17 wherein the contact mapping repository is updated each time a user is added or deleted from the community, and each time a user adds or removes another user to or from the user's contacts.

19. The system of claim 11 wherein:
the messaging service facilitates chats between users of the community, each of the chats being assigned a unique chat ID, and
wherein when a user enters a chat, the user's messaging device generates and transmits a presence indicator object to the server over the network, the presence object indicator including the user's ID and the chat ID embedded therein.

20. The system of claim 19 wherein when the user engages in communications activities in the joined chat, the user's messaging device generates an activity indicator object that includes the chat ID, the user's ID and activity type unique to the activity in which the user is engaged.

* * * * *